(12) United States Patent
Makino et al.

(10) Patent No.: US 8,392,094 B2
(45) Date of Patent: Mar. 5, 2013

(54) CONTROL APPARATUS FOR AN INTERNAL COMBUSTION ENGINE

(75) Inventors: Tomokazu Makino, Chiyoda-ku (JP); Hideki Hagari, Chiyoda-ku (JP); Keitaro Ezumi, Hiroshima (JP); Tomokuni Kusunoki, Hiroshima (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 271 days.

(21) Appl. No.: 12/965,329

(22) Filed: Dec. 10, 2010

(65) Prior Publication Data

US 2011/0224882 A1  Sep. 15, 2011

(30) Foreign Application Priority Data

Mar. 12, 2010 (JP) .................................. 2010-056332

(51) Int. Cl.
*F02D 43/00* (2006.01)
*F02P 5/152* (2006.01)
(52) U.S. Cl. .................... 701/102; 701/103; 123/406.26; 73/114.02
(58) Field of Classification Search .................. 701/102, 701/103, 105, 107, 111, 114, 115; 123/406.11, 123/406.14, 406.21, 406.22, 406.24, 406.26, 123/406.29, 406.41, 406.45, 435, 436; 73/35.01, 73/35.03, 35.06, 114.02, 114.03, 114.08, 73/114.19, 114.62, 114.63, 114.68
See application file for complete search history.

(56) References Cited

U.S. PATENT DOCUMENTS

| 4,711,212 | A   | * | 12/1987 | Haraguchi et al. ........ 123/406.38 |
|-----------|-----|---|---------|-------------------------------------|
| 6,105,552 | A   | * | 8/2000  | Arisawa et al. .......... 123/406.37 |
| 7,480,557 | B2  | * | 1/2009  | Yamaguchi et al. .......... 701/104  |
| 2003/0061803 | A1 | * | 4/2003 | Iihoshi et al. .................... 60/285 |
| 2008/0215293 | A1 | * | 9/2008 | Tahara et al. .................. 702/183 |
| 2009/0043484 | A1 | * | 2/2009 | Yoshihara et al. ............. 701/111 |
| 2010/0036587 | A1 | * | 2/2010 | Kato et al. ..................... 701/103 |
| 2010/0077992 | A1 | * | 4/2010 | Auclair et al. ................. 123/435 |
| 2011/0113869 | A1 | * | 5/2011 | Duval et al. ................ 73/114.16 |

FOREIGN PATENT DOCUMENTS

| JP | 11-050892 A | 2/1999 |
|----|-------------|--------|
| JP | 2001-159348 A | 6/2001 |

* cited by examiner

*Primary Examiner* — John T. Kwon
*Assistant Examiner* — Johnny Hoang
(74) *Attorney, Agent, or Firm* — Sughrue Mion, PLLC

(57) ABSTRACT

A control apparatus for an internal combustion engine includes: an abnormal combustion detection unit for detecting an abnormal combustion due to self-ignition occurring; a pre-ignition determination unit for detecting abnormal combustion occurrence timing based on abnormal combustion detection information to determine whether or not the abnormal combustion is the pre-ignition based on comparison between pre-ignition determination timing and the abnormal combustion occurrence timing; a heat-source pre-ignition determination unit for determining whether the pre-ignition is the heat-source pre-ignition or the compression pre-ignition based on comparison between the abnormal combustion occurrence timing set by the pre-ignition determination timing and heat-source pre-ignition determination timing; a first avoidance unit for avoiding the heat-source pre-ignition in a case where the pre-ignition is determined as the heat-source pre-ignition; and a second avoidance unit for avoiding the compression pre-ignition in a case where the pre-ignition is determined as the compression pre-ignition.

6 Claims, 12 Drawing Sheets

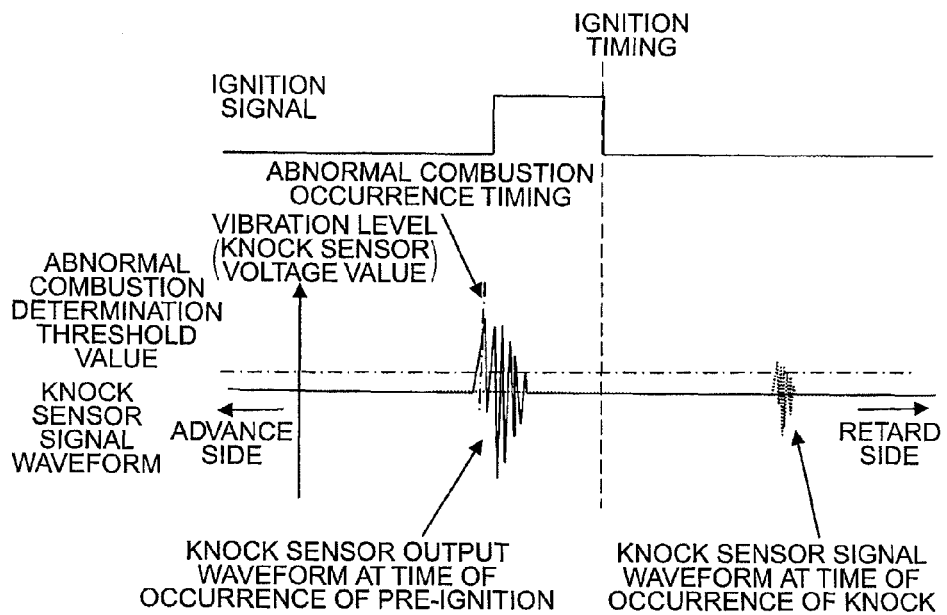
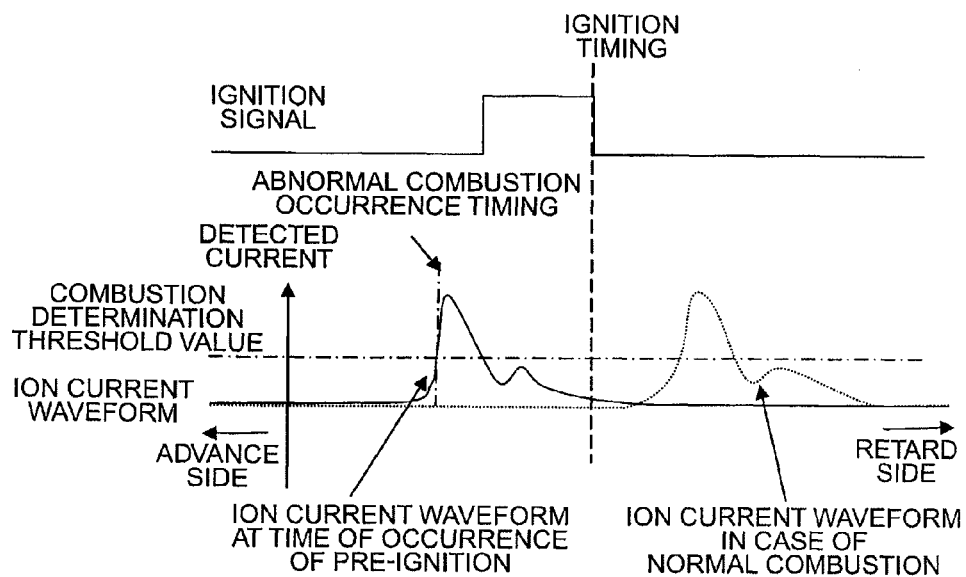

|  |  | ENGINE RPM [r/min] | | | |
|---|---|---|---|---|---|
|  |  | 1000 | 2000 | 3000 | 4000 |
| CHARGING EFFICIENCY [%] | 0 | | | | |
|  | 25 | | | | |
|  | 50 | | | | |
|  | 100 | | | | |

|  |  | ENGINE RPM[r/min] | | | |
|---|---|---|---|---|---|
|  |  | 1000 | 2000 | 3000 | 4000 |
| CHARGING EFFICIENCY [%] | 0 | 5 | 4 | 4 | 3 |
|  | 25 | 5 | 4 | 4 | 3 |
|  | 50 | 5 | 3 | 3 | 2 |
|  | 100 | 5 | 3 | 3 | 2 |

|  |  | ENGINE RPM[r/min] | | | |
|---|---|---|---|---|---|
|  |  | 1000 | 2000 | 3000 | 4000 |
| CHARGING EFFICIENCY [%] | 0 | 3 | 2 | 2 | 1 |
|  | 25 | 3 | 2 | 2 | 1 |
|  | 50 | 3 | 1 | 1 | 1 |
|  | 100 | 3 | 1 | 1 | 1 |

CONTROL APPARATUS FOR AN INTERNAL COMBUSTION ENGINE

BACKGROUND OF THE INVENTION

1. Field of the Invention

The present invention relates to a control apparatus for an internal combustion engine, which is mounted, for example, in a vehicle.

2. Description of the Related Art

In a high-compression ratio spark-ignition internal combustion engine, an abnormal combustion sometimes occurs to lead to combustion noise or a fluctuation in output. The "abnormal combustion" here means a phenomenon in which a fluctuation in in-cylinder pressure, which occurs with the combustion, becomes excessively large. As the types of abnormal combustion, pre-ignition and knocking are generally known. The pre-ignition occurs before the implementation of the spark ignition, whereas the knocking occurs after the implementation of the spark ignition.

There are two types of abnormal combustion phenomenon as the pre-ignition. In one type of the abnormal combustion phenomenon, a temperature of an air-fuel mixture (mixture of air and fuel) present in a cylinder is elevated due to compression to cause self-ignition (hereinafter, this type of abnormal combustion is referred to as "compression pre-ignition"). In the other type of abnormal combustion phenomenon, a tip of a spark plug or a deposit becomes a hot spot to cause ignition (hereinafter, this type of abnormal combustion is referred to as "heat-source pre-ignition"). The knocking is considered as a phenomenon in which an end-gas in a peripheral space of a combustion chamber causes self-ignition during a combustion process after the ignition.

The phenomena described above not only cause noise and vibrations but also lead to damages in the cylinder. Ultimately, there is a fear in that the internal combustion engine does not operate. Therefore, there has conventionally been proposed a method of detecting the pre-ignition and determining whether the pre-ignition is the compression pre-ignition or the heat-source pre-ignition so as to implement avoidance means.

For example, JP 2001-159348 A (hereinafter, referred to as Patent Document 1) describes that a factor of occurrence of the self-ignition occurring while the internal combustion engine operates at low rpm under a high load and that of the self-ignition occurring while the internal combustion engine operates at high rpm under a high load differ from each other and therefore the two types of self-ignition may not be avoided by the same avoidance means. In this context, Patent Document 1 describes the following control apparatus. When an effective compression ratio exceeds an allowable amount which enables the suppression of occurrence of the pre-ignition due to the self-ignition, the control apparatus corrects timing of closing an intake valve, which is set based on the degree of opening of an accelerator and a rotating speed of an internal combustion engine while the internal combustion engine operates at low rpm under a high load, to closing timing which makes the effective compression ratio to be an allowable value.

Moreover, JP 11-50892 A (hereinafter, referred to as Patent Document 2) describes a control apparatus for an internal combustion engine, which determines whether the pre-ignition is initial pre-ignition or runaway pre-ignition based on the number of times of occurrence or a frequency of occurrence of the pre-ignition. The initial pre-ignition has a small number of times of occurrence or a low frequency of occurrence and occurs at late timing, whereas the runaway pre-ignition has a large number of times of occurrence or a high frequency of occurrence and occurs at early timing. When the pre-ignition is determined as the runaway pre-ignition, the control apparatus stops fuel supply.

Patent Document 1 describes the compression pre-ignition and the heat-source pre-ignition, and countermeasures for each. As the countermeasures against the pre-ignition occurring while the internal combustion engine operates at low rpm under a high load (compression pre-ignition), means of reducing the effective compression ratio is given. As the countermeasures against the pre-ignition occurring while the internal combustion engine operates at high rpm under a high load (heat-source pre-ignition), means of retarding ignition timing is given. Therefore, the means for avoiding the pre-ignition is switched depending on the engine rpm. However, there is a fear in that the heat-source pre-ignition occurs even when the internal combustion engine operates at low rpm. The heat-source pre-ignition is generally considered to occur as described above; specifically, heat accumulated in the spark plug or the deposit causes the spark plug or the deposit to be the heat source, leading to the self-ignition. When the internal combustion engine operates at low rpm, the heat is released before the heat is accumulated in the spark plug or the deposit. Therefore, the heat-source pre-ignition is unlikely to occur while the internal combustion engine operates at low rpm.

However, the following case is also conceivable. The heat is accumulated in a portion of a wall surface, which has an elevated temperature due to poor cooling, or in a broken portion of any one of spark plugs of a dual ignition system including two spark plugs in the cylinder to generate a heat source. In such a case, it is considered that the heat-source pre-ignition occurs even when the internal combustion engine operates at low rpm. Thus, it is considered whether the pre-ignition is the heat-source pre-ignition or the compression pre-ignition may not be determined based on the engine rpm.

On the other hand, Patent Document 2 describes the determination of two types of pre-ignition based on the number of times of occurrence or the frequency of occurrence of the pre-ignition. According to the method described in Patent Document 2, for the determination of two types of pre-ignition, it is necessary for a vehicle to continue running for a certain period of time under an operating load which causes the pre-ignition. Here, the case where the determination is made based on the number of times of occurrence is described. For example, it is supposed as follows. When the number of times of occurrence of the pre-ignition is ten or more, the pre-ignition is determined as the heat-source pre-ignition. In the other cases, the pre-ignition is determined as the compression pre-ignition. It is supposed that the currently occurring pre-ignition is the heat-source pre-ignition.

FIG. 18 illustrates a time chart in the case where the vehicle constantly runs under the operating load which causes the heat-source pre-ignition. Profiles illustrated in FIG. 18 indicate the operating load, a pre-ignition determination flag, a down-counter for determining the occurrence of the heat-source pre-ignition, and a heat-source pre-ignition determination flag in this order from the top. It is supposed that the pre-ignition occurs when the operating load has a predetermined value or larger. A predetermined load, under which the pre-ignition is caused, is indicated by a dot line in the portion indicating the operating load in the time chart. When the pre-ignition is detected ten times or more as illustrated in FIG. 18 under the constant operating load, the occurrence of the heat-source pre-ignition may be quickly determined.

Because the pre-ignition occurs with the generation of noise, it is easily conceivable that the driver releases an accelerator pedal so as to reduce the operating load when the pre-ignition occurs. Therefore, the operating load does not normally become constant and does not remain under the same conditions which allow the number of times of occurrence or the frequency of occurrence to be counted.

FIG. 19 illustrates a time chart in the case where the operating load is not constant. Profiles illustrated in FIG. 19 indicate the operating load, the pre-ignition determination flag, the down-counter for determining the occurrence of the heat-source pre-ignition, and the heat-source pre-ignition determination flag in this order from the top. As in the case of FIG. 18, it is supposed that the pre-ignition occurs when the operating load has the predetermined value or larger. The predetermined load, under which the pre-ignition is caused, is indicated by a dot line in the portion indicating the operating load in the time chart. Because the operating load is not constant, the pre-ignition is detected intermittently. Therefore, it is understood that the occurrence of the heat-source pre-ignition may not be determined because the down-counter may not constantly down-count the number to zero. Moreover, as the operating condition under which the above-mentioned phenomenon is likely to occur, there is an acceleration state from a state where the vehicle is stopped. Further, it is considered that the heat-source pre-ignition is caused due to a failure as described above, and hence the quick detection of the heat-source pre-ignition is demanded.

Although the methods of determining whether the pre-ignition is the compression pre-ignition or the heat-source pre-ignition as described above are available, there is a problem of incomplete detection of the heat-source pre-ignition while the internal combustion engine operates at low rpm. In addition, there is another problem in that the operating conditions are required to remain unchanged until the determination of occurrence of the heat-source pre-ignition.

SUMMARY OF THE INVENTION

The present invention has been made to solve the problems described above, and has an object to provide a control apparatus for an internal combustion engine, which is capable of determining whether ignition is compression pre-ignition or heat-source pre-ignition by single detection of pre-ignition regardless of engine rpm.

According to the present invention, a control apparatus for an internal combustion engine includes: abnormal combustion detection means for detecting an abnormal combustion due to self-ignition occurring regardless of ignition performed by ignition means for implementing ignition at timing set by ignition timing setting means for setting ignition timing of an air-fuel mixture present in a combustion chamber of the internal combustion engine; pre-ignition determination timing setting means for setting pre-ignition determination timing; pre-ignition determination means for detecting abnormal combustion occurrence timing based on abnormal combustion detection information from the abnormal combustion detection means so as to determine whether or not the abnormal combustion is pre-ignition based on comparison between the pre-ignition determination timing set by the pre-ignition determination timing setting means and the abnormal combustion occurrence timing; heat-source pre-ignition determination timing setting means for setting heat-source pre-ignition determination timing; heat-source pre-ignition determination means for determining whether the pre-ignition is heat-source pre-ignition or compression pre-ignition based on comparison between the abnormal combustion occurrence timing set by the pre-ignition determination means and the heat-source pre-ignition determination timing set by the heat-source pre-ignition determination timing setting means; first avoidance means for avoiding the heat-source pre-ignition in a case where the pre-ignition is determined as the heat-source pre-ignition; and second avoidance means for avoiding the compression pre-ignition in a case where the pre-ignition is determined as the compression pre-ignition, in which: upon detection of the abnormal combustion, the first avoidance means determines that the pre-ignition is the heat-source pre-ignition and implements avoidance of the heat-source pre-ignition when the abnormal combustion occurrence timing is on an advance side of the pre-ignition determination timing set by the pre-ignition determination timing setting means and is on an advance side of the heat-source pre-ignition determination timing set by the heat-source pre-ignition determination timing setting means; and upon detection of the abnormal combustion, the second avoidance means determines that the pre-ignition is the compression pre-ignition and implements avoidance of the compression pre-ignition when the abnormal combustion occurrence timing is on the advance side of the pre-ignition determination timing set by the pre-ignition determination timing setting means and is on a retard side of the heat-source pre-ignition determination timing set by the heat-source pre-ignition determination timing setting means.

According to the present invention, a single abnormal combustion is detected. Based on timing of occurrence of the abnormal combustion, whether the pre-ignition is the compression pre-ignition or the heat-source pre-ignition is determined. The avoidance means respectively for the compression pre-ignition and the heat-source pre-ignition are prepared so as to be implemented according to the type of pre-ignition. As a result, the pre-ignition may be effectively avoided to prevent the internal combustion engine from being damaged.

BRIEF DESCRIPTION OF THE DRAWINGS

In the accompanying drawings:

FIG. 5 is an explanatory diagram of a knock sensor signal and an ignition signal (at the time of occurrence of pre-ignition and at the time of occurrence of a knock);

FIG. 6 is an explanatory diagram of an ion current and the ignition signal (at the time of occurrence of pre-ignition and in the case of a normal combustion);

DETAILED DESCRIPTION OF THE PREFERRED EMBODIMENTS

First, a summary of the present invention is described. According to the present invention, a single abnormal combustion is detected. Based on timing of occurrence of the abnormal combustion, whether pre-ignition is compression pre-ignition or heat-source pre-ignition is determined. Avoidance means respectively for the compression pre-ignition and the heat-source pre-ignition are prepared so as to be implemented according to the type of pre-ignition. As a result, the pre-ignition may be effectively avoided to prevent an internal combustion engine from being damaged.

Figure 1:
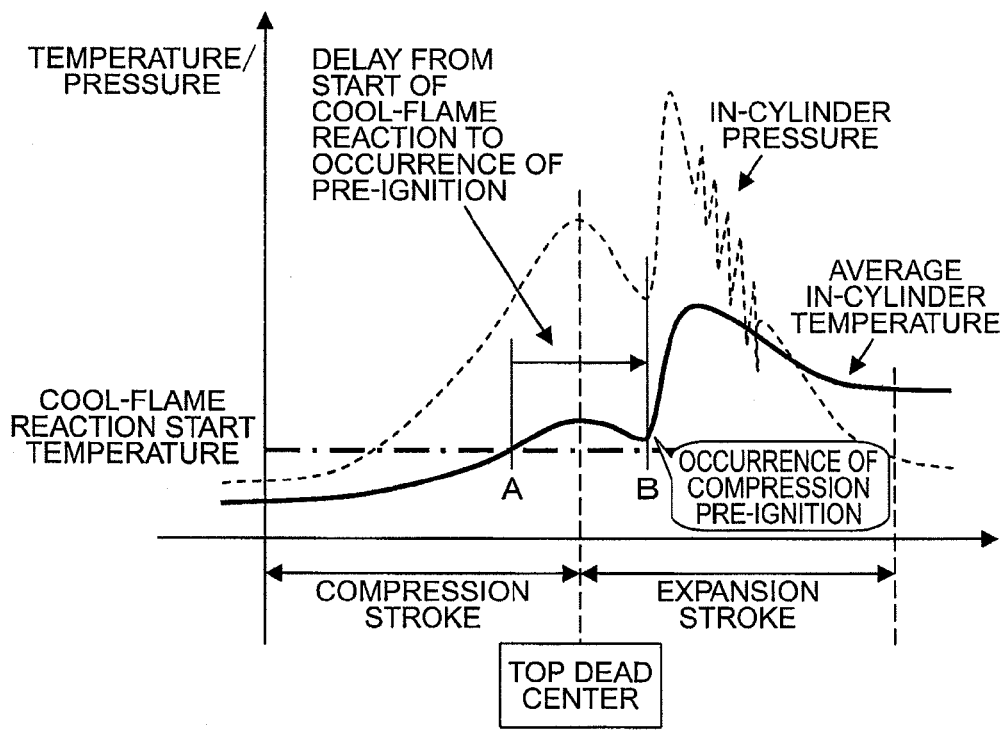
FIG. 1 is a graph for illustrating the present invention, illustrating a change in in-cylinder temperature and a change in in-cylinder pressure at the time of occurrence of compression pre-ignition.

The compression pre-ignition occurs as a result of a high-temperature state of a compressed air-fuel mixture, which lasts for a long time as described above. FIG. 1 illustrates a change in in-cylinder temperature and a change in in-cylinder pressure in the vicinity of a compression stroke at the time of occurrence of the compression pre-ignition. In FIG. 1, a solid line indicates an average in-cylinder temperature of the air-fuel mixture, whereas a broken line indicates the in-cylinder pressure. The in-cylinder pressure increases from a bottom dead center to a top dead center. With an increase in in-cylinder pressure, the temperature of the air-fuel mixture is elevated. A cool-flame reaction is accelerated at a predetermined temperature (indicated by A in FIG. 1) before the top dead center. After that, if the high-temperature state lasts for a long time, the compression pre-ignition occurs (indicated by B in FIG. 1). The cool-flame reaction starts at, for example, about 500° C. in the case of regular gasoline. A temperature at which the cool-flame reaction starts is indicated by an alternate long and short dash line in FIG. 1. A delay is generated between the start of the cool-flame reaction and the occurrence of the pre-ignition although a length of the delay differs depending on an in-cylinder temperature condition. It is confirmed by an experiment that timing of occurrence of the compression pre-ignition is after the top dead center due to the influence of the delay, and hence the compression pre-ignition is considered to occur after the top dead center.

Figure 2:
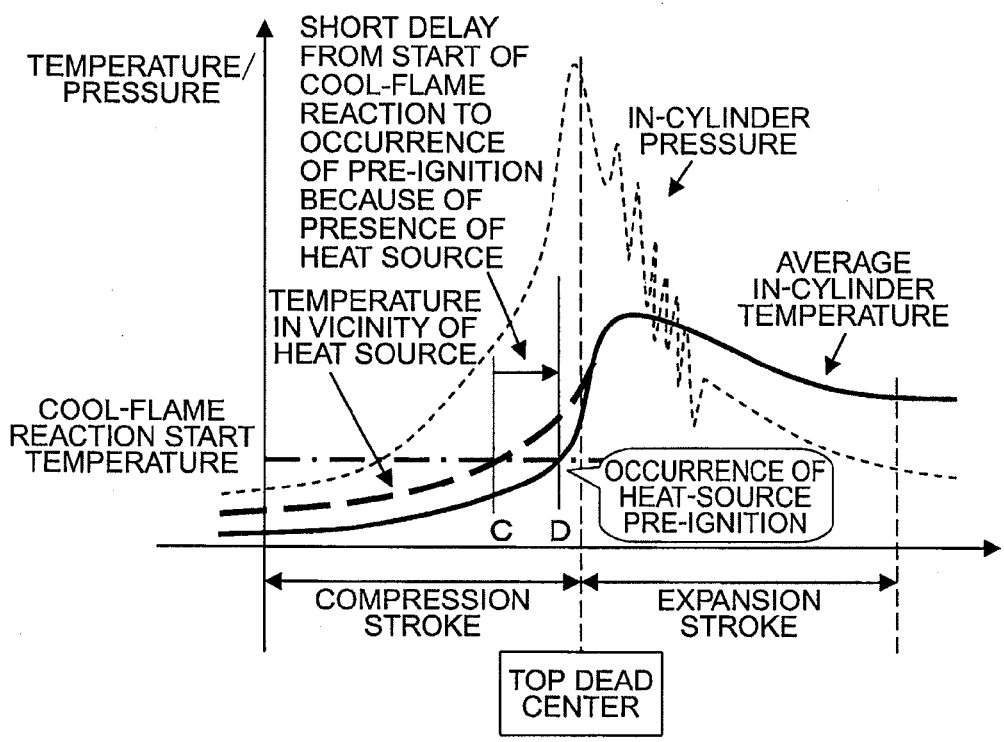
FIG. 2 is a graph for illustrating the present invention, illustrating a change in in-cylinder temperature and a change in in-cylinder pressure at the time of occurrence of heat-source pre-ignition.

Next, the occurrence of the heat-source pre-ignition is described. FIG. 2 illustrates a change in in-cylinder temperature and a change in in-cylinder pressure in the vicinity of the compression stroke at the time of occurrence of the heat-source pre-ignition. In FIG. 2, a solid line indicates an average in-cylinder temperature of the air-fuel mixture, a thick broken line indicates a temperature of the air-fuel mixture in the vicinity of a heat source (for example, around a broken plug), and a broken line indicates the in-cylinder pressure. A temperature at which the cool-flame reaction starts is indicated by an alternate long and short dash line. The in-cylinder pressure increases from the bottom dead center to the top dead center. With the increase in pressure, the temperature of the air-fuel mixture is elevated. When a temperature of the heat source is high, the air-fuel mixture in the vicinity of the heat source has a particularly elevated temperature. Therefore, in comparison with the case without the presence of the heat source, the cool-flame reaction starts earlier (indicated by C in FIG. 2). Further, in the case where the air-fuel mixture has a high temperature, a time period from the start of the cool-flame reaction to the ignition becomes shorter. As a result, the heat-source pre-ignition occurs (indicated by D in FIG. 2). In general, it is considered that the time period from the start of the cool-flame reaction to the occurrence of the ignition becomes shorter as the temperature of the air-fuel mixture becomes higher. Although timing of occurrence of the heat-source pre-ignition is unknown because the in-cylinder temperature is actually unknown, it is confirmed by an experiment that the heat-source pre-ignition occurs before the top dead center. Thus, the heat-source pre-ignition is considered to occur before the top dead center.

Therefore, the pre-ignition occurring before the top dead center is considered as the heat-source pre-ignition, whereas the pre-ignition occurring after the top dead center is considered as the compression pre-ignition. Whether the pre-ignition is the compression pre-ignition or the heat-source pre-ignition may be determined based on the above-mentioned phenomena. Hereinafter, specific embodiments of the present invention are described.

First Embodiment

Figure 3:
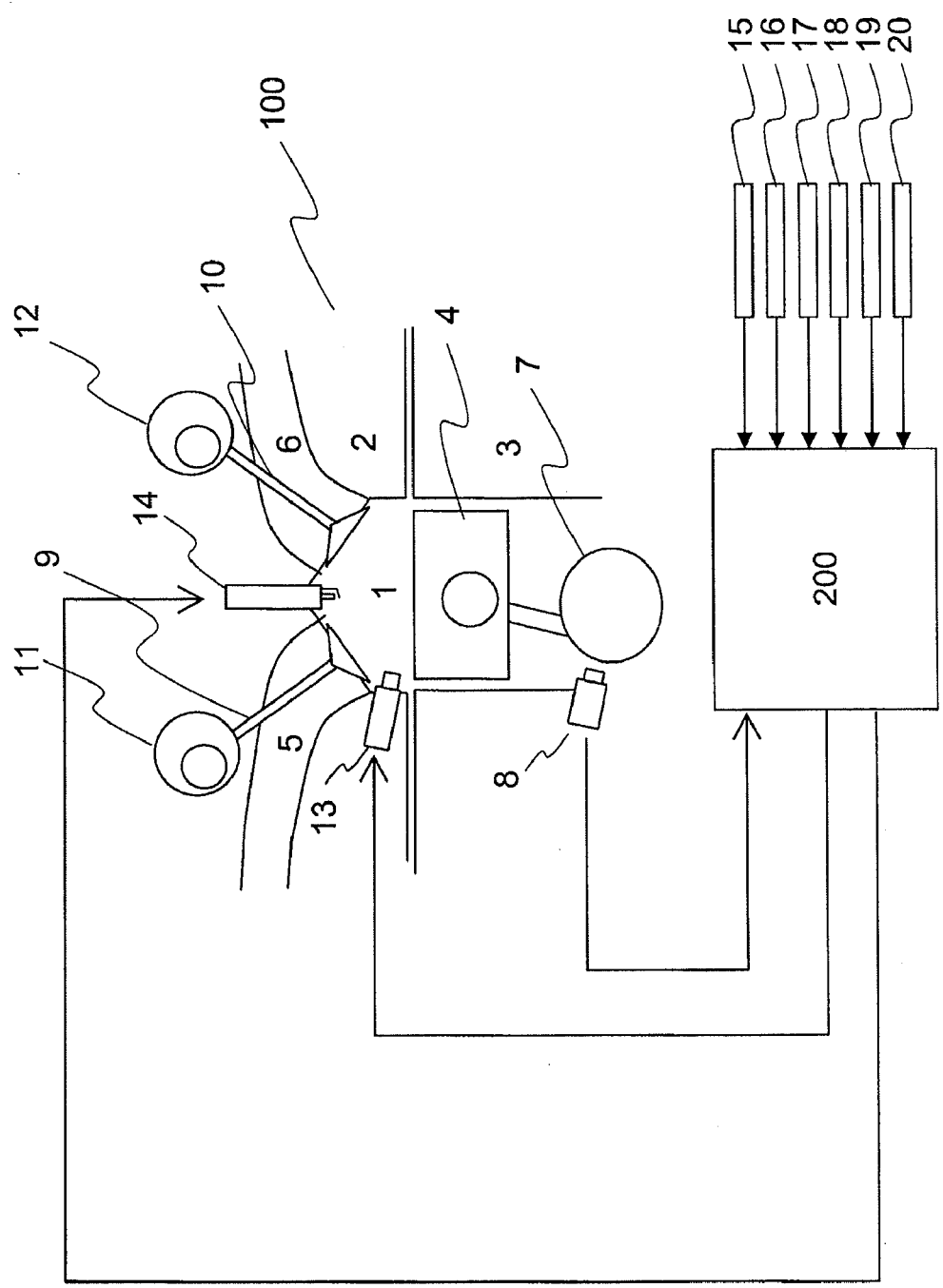
FIG. 3 is a configuration diagram illustrating a control apparatus for an internal combustion engine according to a first embodiment of the present invention, illustrating the schema of the internal combustion engine and an ECU.

FIG. 3 is a configuration diagram illustrating a control apparatus for an internal combustion engine according to a first embodiment of the present invention, which illustrates the schema of the internal combustion engine (hereinafter, also referred to simply as an "engine") 100 and an engine control unit (ECU) 200. A combustion chamber 1 of the internal combustion engine 100 includes a cylinder head 2, a cylinder block 3, and a piston 4. An intake port 5 and an exhaust port 6 are connected to the combustion chamber 1. The intake port 5 and the exhaust port 6 are formed to be provided to the cylinder head 2.

A crank shaft 7 is connected to the piston 4. The crank shaft 7 is rotated by vertical movement of the piston 4. The crank shaft 7 is rotated by vertical movement of the piston 4. A crank plate (not shown) is mounted to the crank shaft 7. The crank plate has projections. A crank-angle detection sensor 8 detects the projections to detect rpm and a crank angular position of the crank shaft 7.

An intake valve 9 which is operated by an intake cam 11 is provided on the combustion chamber 1 side of the intake port 5, whereas an exhaust valve 10 which is operated by an exhaust cam 12 is provided on the combustion chamber 1 side of the exhaust port 6. A fuel injection valve 13 is provided in a part of the cylinder head 2 below the intake port 5. A spark plug 14 is provided in an upper center portion of the combustion chamber 1. A phase-variable system (not shown) is connected to the intake cam 11. A phase of the intake cam 11 is varied to change opening/closing timing of the intake valve 9.

A combustion cycle is described. First, during an intake stroke, air introduced from the intake port 5 through the intake valve 9 and a fuel injected from the fuel injection valve 13 form an air-fuel mixture in the combustion chamber 1. Next, the air-fuel mixture is compressed by the piston 4 during a compression stroke. After that, the air-fuel mixture is ignited by the spark plug 14 in the vicinity of the top dead center. During a subsequent expansion stroke, the ignited air-fuel mixture pushes down the piston 4 to rotate the crank shaft 7. After being expanded, the air-fuel mixture in the combustion chamber 1 is exhausted through the exhaust valve 10 from the exhaust port 6 during an exhaust stroke. The above-mentioned process corresponds to the combustion cycle.

Signals from the crank-angle sensor 8, an intake-air amount sensor 15, a throttle-position sensor 16, a water-temperature sensor 17, a phase-angle sensor 18 for the intake cam 11, a knock sensor 19, an ion-current sensor 20, and the like are input to the ECU 200 where rpm of the internal combustion engine, ignition timing, a fuel injection amount, a phase-shift amount of the intake cam 11, and the like are calculated. The intake-air amount sensor 15 detects the amount of intake air introduced into the combustion chamber 1. The throttle-position sensor 16 detects the degree of opening of a throttle. The water-temperature sensor 17 detects a temperature of cooling water for the internal combustion engine. The knock sensor 19 detects a vibration of the internal combustion engine. The ion-current sensor 20 is included in an ignition coil to detect combustion ions in the combustion chamber 1.

Figure 4:
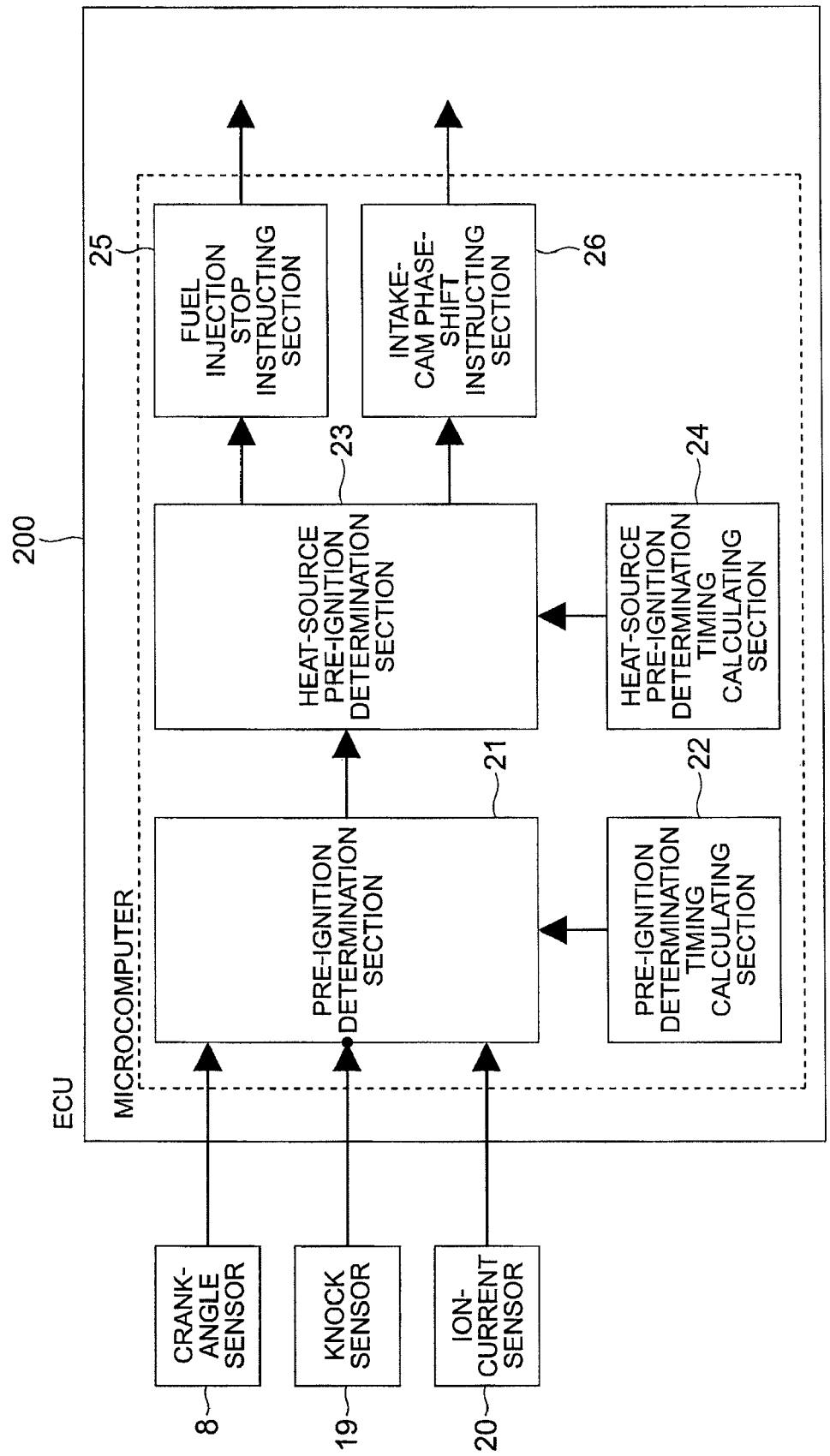
FIG. 4 is a block diagram illustrating the schema of pre-ignition determination control in the first embodiment of the present invention.

Next, the schema of pre-ignition control executed in the ECU 200 is described referring to FIG. 4. FIG. 4 is a block diagram illustrating an overall configuration of the pre-ignition control by the ECU 200, which is executed in this first embodiment. A configuration of a pre-ignition control section included in the ECU 200 illustrated in FIG. 4 is described. The ECU 200 includes various I/F circuits (not shown) and a microcomputer (not shown). The microcomputer includes an A/D converter, a ROM area, a RAM area, and the like. The ND converter converts an analog signal into a digital signal. The ROM area stores a control program and control constants therein. The RAM area stores variables at the time of execution of the program.

A pre-ignition determination section 21 included in the ECU 200 as the pre-ignition control section detects an abnormal combustion based on information from the knock sensor 19 and the ion-current sensor 20 which are used as abnormal combustion detection means for detecting the abnormal combustion. The pre-ignition determination section 21 also detects timing of occurrence of the abnormal combustion (hereinafter, referred to as abnormal combustion occurrence timing) based on the abnormal combustion detection information and information from the crank-angle sensor 8. Further, the pre-ignition determination section 21 compares timing of determination of the pre-ignition, which is transmitted from a pre-ignition determination timing calculating section 22, and the abnormal combustion occurrence timing with each other to determine the occurrence of pre-ignition.

The abnormal combustion and the abnormal combustion occurrence timing are detected by the knock sensor 19 or the ion-current sensor 20 in this first embodiment. For example, in the case where the abnormal combustion and the abnormal combustion occurrence timing are detected by the knock sensor 19, a vibration generated due to the abnormal combustion is detected by the knock sensor 19. The knock sensor 19 detects the vibration after converting the vibration into a voltage. Based on a vibration level input to the knock sensor 19, the detection of the abnormal combustion and the detection of the abnormal combustion occurrence timing are implemented.

FIG. 5 illustrates a relation between an ignition signal and a knock sensor signal. An abscissa axis corresponds to a time axis (angular axis). The left is an advance side, whereas the right is a retard side. A waveform of the ignition signal and a waveform of the knock sensor signal are illustrated in the stated order from the top. An ordinate axis for the waveform of the knock sensor signal indicates a vibration level. As the vibration level becomes higher, the vibration becomes greater. A part of the waveform of the knock sensor signal, which is indicated on the advance side of ignition timing illustrated in FIG. 5, is a waveform at the time of occurrence of the pre-ignition. A part of the knock-sensor signal waveform, which is indicated on the retard side of the ignition timing, is a waveform at the time of occurrence of a knock. In general, a predetermined abnormal combustion determination threshold value is set. When the vibration level of the knock sensor signal exceeds the threshold value, the occurrence of the abnormal combustion is determined. Further, in this first embodiment, timing at which a peak of the vibration level of the knock sensor signal is generated is determined as the abnormal combustion occurrence timing.

Next, the case where the abnormal combustion is detected by using the ion-current sensor 20 is described. The ion-current sensor 20 applies a voltage between electrodes of the spark plug 14 so as to detect a current (ion current) using combustion ions generated in the cylinder at the time of combustion as a path. Therefore, when the ion current is detected on the advance side of the ignition timing, the combustion occurs independently of the ignition signal. Therefore, the occurrence of the abnormal combustion may be determined.

FIG. 6 illustrates a relation between the ignition signal and a waveform of the ion current. An abscissa axis corresponds to a time axis (angular axis). The left is an advance side, whereas the right is a retard side. A waveform of the ignition signal and the waveform of the ion current are illustrated in the stated order from the top. An ordinate axis for the waveform of the ion current indicates a current. As the current becomes higher, the detected current becomes greater. A part of the waveform of the ion current, which is situated on the advance side of the ignition timing illustrated in FIG. 6, is a waveform at the time of occurrence of the pre-ignition. On the other hand, a part of the waveform of the ion current, which is situated on the retard side of the ignition timing, is a waveform in the case of a normal combustion. In general, combustion and combustion timing are determined as follows. A predetermined combustion determination threshold value is set. When the ion current exceeds the combustion determination threshold value, it is determined that the combustion occurs. Timing at which the determination of occurrence of the combustion is made is determined as combustion timing. In this manner, the combustion and the combustion timing may be detected. When the occurrence of the combustion is determined at timing on the advance side of the ignition timing, the occurrence of the abnormal combustion is determined as described above. Pre-ignition detection processing is executed at intervals of, for example, 180 deg.CA.

It is apparent that the abnormal combustion may also be detected by using an in-cylinder pressure sensor or other sensors for detecting a fluctuation in rotation and the like.

The description now returns to the schema of the pre-ignition control performed in the ECU 200. A heat-source pre-ignition determination section 23 provided as the pre-ignition control section included in the ECU 200 compares the abnormal combustion occurrence timing according to each of the abnormal combustion detection means, which is transmitted from the pre-ignition determination section 21, and heat-source pre-ignition determination timing transmitted from a heat-source pre-ignition determination timing calculating section 24 to determine whether the pre-ignition is the heat-source pre-ignition or the compression pre-ignition. According to the determined type of pre-ignition, a fuel injection stop instructing section 25 corresponding to first avoidance means for the heat-source pre-ignition instructs a fuel control section (not shown) to stop the fuel supply, or an intake-cam phase-shift instructing section 26 corresponding to second avoidance means for the compression pre-ignition instructs an intake-cam phase-shift implementing section (not shown) to shift the phase of the intake cam 11. In this manner, the pre-ignition is avoided.

The heat-source pre-ignition and the first avoidance means, and the compression pre-ignition and the second avoidance means are now described. The first avoidance means is avoidance means for avoiding the heat-source pre-ignition, whereas the second avoidance means is avoidance means for avoiding the compression pre-ignition.

The heat-source pre-ignition is an abnormal combustion in which heat accumulated in a tip of the spark plug, a deposit, a foreign substance entering the cylinder, a poorly cooled wall surface, and the like become a hot spot to cause ignition. The heat-source pre-ignition is likely to occur under conditions where the engine operates at high rpm under a high load, which elevate the in-cylinder temperature. The occurrence of the heat-source pre-ignition often falls in a vicious circle. Specifically, the abnormal combustion occurs for each injection of the fuel to elevate the in-cylinder temperature, thereby causing the abnormal combustion again.

Therefore, as a method of avoiding the heat-source pre-ignition, a method of stopping the fuel injection so as to stop the occurrence of the abnormal combustion and reducing the engine rpm so as to change an operating point, a method of reducing the effective compression ratio so as to suppress an increase in the in-cylinder temperature due to compression, and the like are conceived.

In this first embodiment, the first avoidance means uses, for example, at least one of the methods described above. In this case, the method of stopping the fuel injection is used.

The compression pre-ignition is now described. The compression pre-ignition is an abnormal combustion in which the air-fuel mixture in the cylinder is compressed to have an elevated temperature and the high-temperature state in the cylinder lasts for a long time to accelerate a cool-flame reaction, resulting in self-ignition. The long lasting high-temperature state of the air-fuel mixture is one of the conditions of occurrence of the compression pre-ignition, and hence the compression pre-ignition is likely to occur while the engine operates at low rpm, which increases a time period of each stroke.

Next, a method of avoiding the compression pre-ignition is described. In order to avoid the compression pre-ignition, it is important to prevent the high-temperature state of the air-fuel mixture from lasting for a long period of time. Therefore, a method of shifting the fuel injection timing to the retard side to reduce a period of time in which the air-fuel mixture is formed in the cylinder, a method of increasing the fuel injection amount to lower the in-cylinder temperature with fuel evaporation heat, a method of changing timing of closing the intake valve 9 to reduce the effective compression ratio so as to suppress an increase in temperature of the air-fuel mixture due to compression, and a method of changing a transmission gear ratio to increase the engine rpm to prevent the high-temperature state of the air-fuel mixture from lasting for a long period of time are conceived.

In this first embodiment, the second avoidance means uses the method of changing the timing of closing the intake valve 9 to reduce the effective compression ratio so as to suppress the increase in temperature of the air-fuel mixture due to compression. Instead of the above-mentioned method, any methods which are effective in avoidance of the compression pre-ignition may be used.

Figure 7:
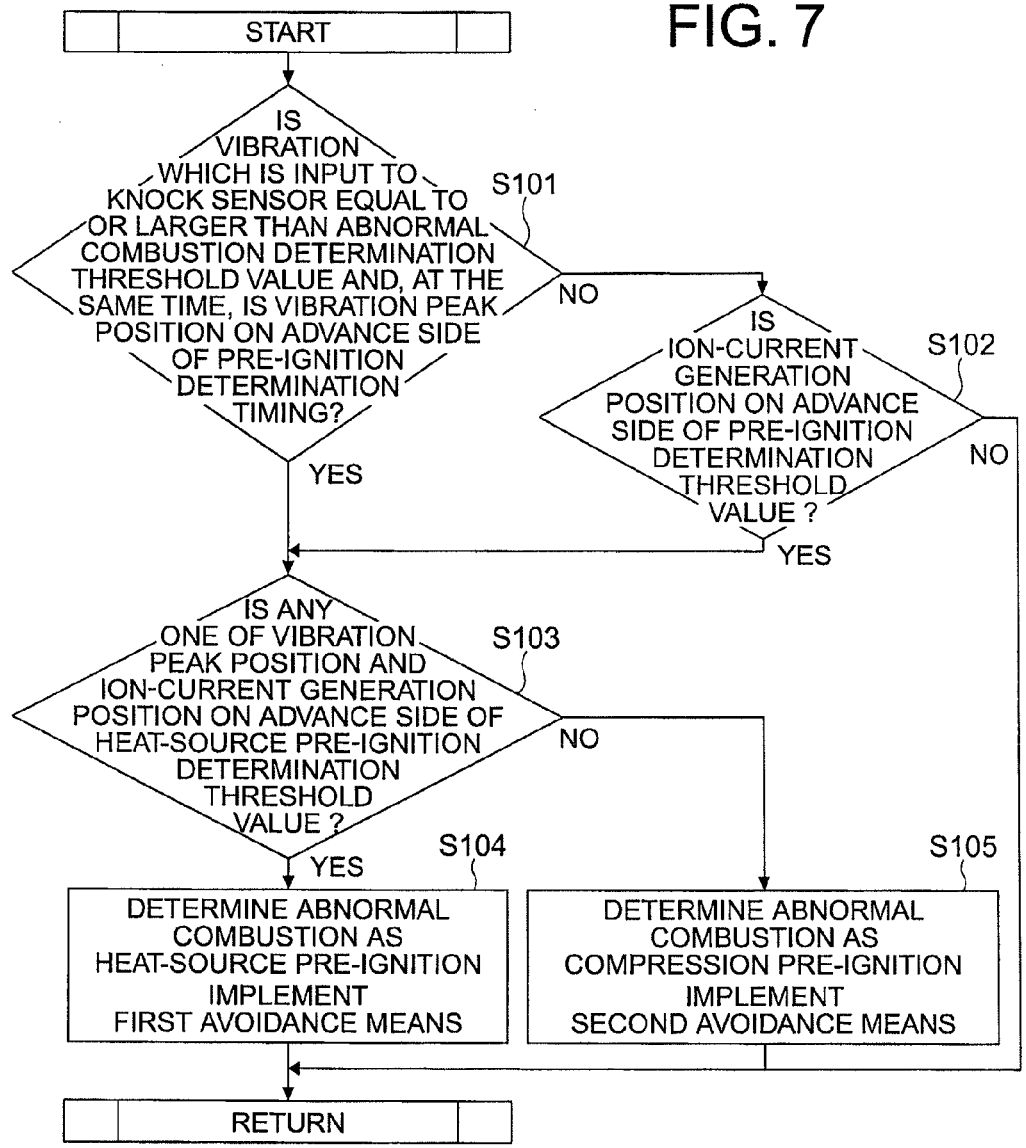
FIG. 7 is a flowchart of selection of avoidance means at the time of determination of the pre-ignition in the first embodiment.

Processing of the first embodiment is described along a flowchart of FIG. 7. The flowchart of FIG. 7 illustrates the processing of determining whether the pre-ignition is the compression pre-ignition or the heat-source pre-ignition. The processing is executed at timing in synchronization with an engine revolution (for example, interruption processing executed at intervals of 180 deg.CA and the like; "deg.CA" means a crank angle).

First, in a determination section S101, it is determined whether or not the abnormal combustion is detected by using the knock sensor 19. Specifically, it is determined whether the vibration level input to the knock sensor 19 is equal to or larger than the abnormal combustion determination threshold value, and at the same time, whether the position of the peak of the vibration (hereinafter, referred to as a vibration peak position) is on the advance side of the pre-ignition determination timing. If so (YES), the processing proceeds to a determination section S103. If not (NO), the processing proceeds to a determination section S102.

For example, it is assumed that the vibration level input to the knock sensor 19 (voltage input to the knock sensor 19) is 2.0 V, the vibration-level peak timing is −5 deg.CA. ATDC, and the ignition timing is 20 deg.CA. ATDC. Herein, ATDC is an abbreviation of After Top Dead Center.

In this case, as the abnormal combustion determination threshold value, a value which is not generally generated by a vibration during a steady operation is set. In this case, the vibration level during the steady operation is 0 V, and the abnormal combustion determination threshold value is set to a vibration level that is generally higher than a knock determination threshold value, that is, 1.0 V. The "pre-ignition" generally means an abnormal combustion which occurs earlier than the general ignition timing, and hence the pre-ignition determination timing is set to the ignition timing. By setting the pre-ignition determination timing as described above, the number of steps for matching may be reduced.

Thus, in the above-mentioned case, the relation of the vibration level input to the knock sensor>the abnormal combustion determination threshold value, is satisfied, and at the same time, the vibration-level peak timing is on the advance side of the pre-ignition determination timing. Thus, the processing proceeds to a determination section S103.

An operation of the determination section S102 is now described. The determination section S102 determines the detection of the abnormal combustion when the position of generation of the ion current (hereinafter, referred to as the ion-current generation position) detected by the ion-current sensor 20 is on the advance side of the pre-ignition determination timing. Therefore, the processing proceeds to the determination section S103. If not, the processing is terminated.

For example, it is assumed that the ion-current generation position is −7 deg.CA. ATDC and the ignition timing is 20 deg.CA. ATDC. The pre-ignition determination timing is set to the ignition timing, and hence the ion-current generation position is on the advance side of the pre-ignition determination timing in the case described above. Therefore, the processing proceeds to the determination section S103.

As the pre-ignition determination timing used in the determination sections S101 and S102, the ignition timing is set as described above. Therefore, if the abnormal combustion occurs on the advance side of the ignition timing, the abnormal combustion is determined as the pre-ignition.

In the determination section S103, it is determined whether or not the abnormal combustion occurrence timing is on the advance side of the heat-source pre-ignition determination timing. If the abnormal combustion occurrence timing is on the advance side of the heat-source pre-ignition determination timing, the processing proceeds to Step S104. If not, the processing proceeds to Step S105.

The heat-source pre-ignition determination timing used in the determination section S103 is, for example, the top dead center because it is experimentally known that the abnormal combustion occurring before the top dead center is the heat-source pre-ignition and the pre-ignition occurring after the top dead center is the compression pre-ignition. In this manner, the number of steps for matching may be reduced.

For example, if the values used in the determination sections S101 and S102 are used, the vibration peak timing is −5 deg.CA. ATDC and the ion-current generation position is −7 deg.CA. ATDC. Therefore, both the timing and the position are on the advance side of the top dead center. Accordingly, the processing proceeds to Step S104.

In Step S104, it is determined that the currently detected abnormal combustion is the heat-source pre-ignition, and first avoidance control for the heat-source pre-ignition is implemented. Then, the processing is terminated. The first avoidance control for the heat-source pre-ignition is described below.

In Step S105, it is determined that the currently detected pre-ignition is the compression pre-ignition, and second avoidance control for the compression pre-ignition is implemented. Then, the processing is terminated. The second avoidance control for the compression pre-ignition is described below.

Figure 8:
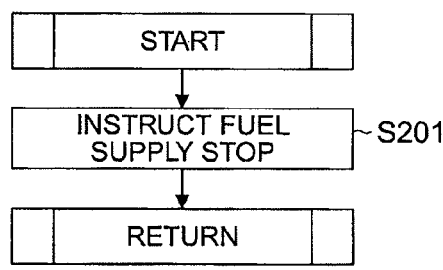
FIG. 8 is a flowchart of control for avoiding the compression pre-ignition.

Next, the first avoidance control in the case where the pre-ignition is determined as the heat-source pre-ignition is described referring to a flowchart of FIG. 8. The flowchart of FIG. 8 illustrates processing of performing control for avoiding the hear-source pre-ignition after the determination of occurrence of the heat-source pre-ignition. In Step S201, the fuel injection is stopped. Then, the control for avoiding the heat-source pre-ignition is terminated.

Figure 9:
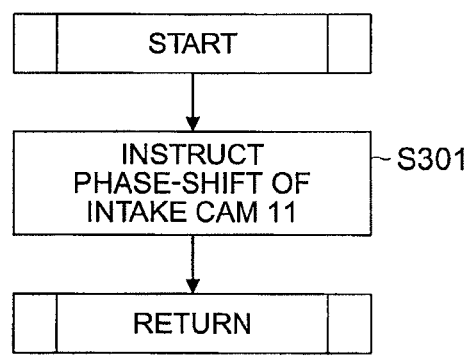
FIG. 9 is a flowchart of control for avoiding the heat-source pre-ignition.

Next, the second avoidance control in the case where the pre-ignition is determined as the compression pre-ignition is described referring to a flowchart of FIG. 9. The flowchart of FIG. 9 illustrates processing of performing control for avoiding the compression pre-ignition after the determination of occurrence of the compression pre-ignition. In Step S301, an instruction of shifting the phase of the intake cam 11 is issued so that the currently set timing of closing the intake valve 9 is delayed to reduce the effective compression ratio. It is sufficient that the amount of phase shift is, for example, about 1 deg.CA. Then, the control for avoiding the compression pre-ignition is terminated.

As described above, whether the pre-ignition is the compression pre-ignition or the heat-source pre-ignition is determined so that the avoidance control set for each is performed. As a result, the pre-ignition may be effectively avoided.

In this first embodiment, the present invention is applied to a direct injection type internal combustion engine. However, the determination of the pre-ignition itself is also effective for other types of internal combustion engine such as a port injection type internal combustion engine.

Second Embodiment

This second embodiment is carried out in the internal combustion engine 100 described in the first embodiment and in a vehicle. In the second embodiment, the pre-ignition determination timing and the heat-source pre-ignition determination timing are set for each of the abnormal combustion detection means. Moreover, the occurrence of heat-source pre-ignition while the engine operates at low rpm is determined so as to implement avoidance means for the heat-source pre-ignition while the engine operates at low rpm. In the above-mentioned points, the second embodiment differs from the first embodiment. Even in the second embodiment, the knock sensor 19 and the ion-current sensor 20 are used for the detection of the abnormal combustion.

Figure 10:
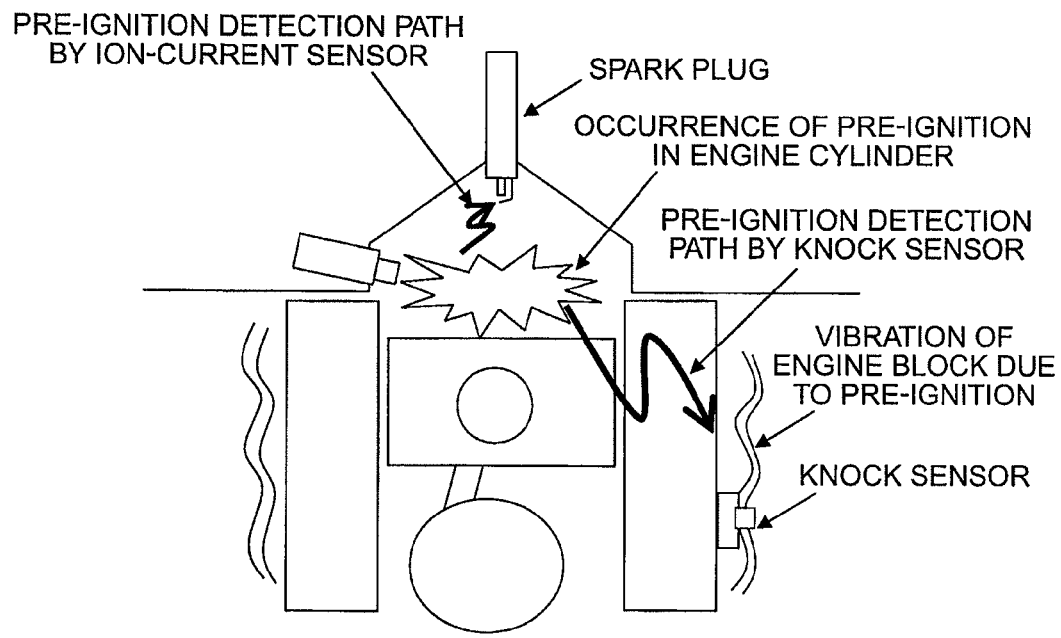
FIG. 10 is a schematic diagram of pre-ignition detection paths.
Figures 11, 12:
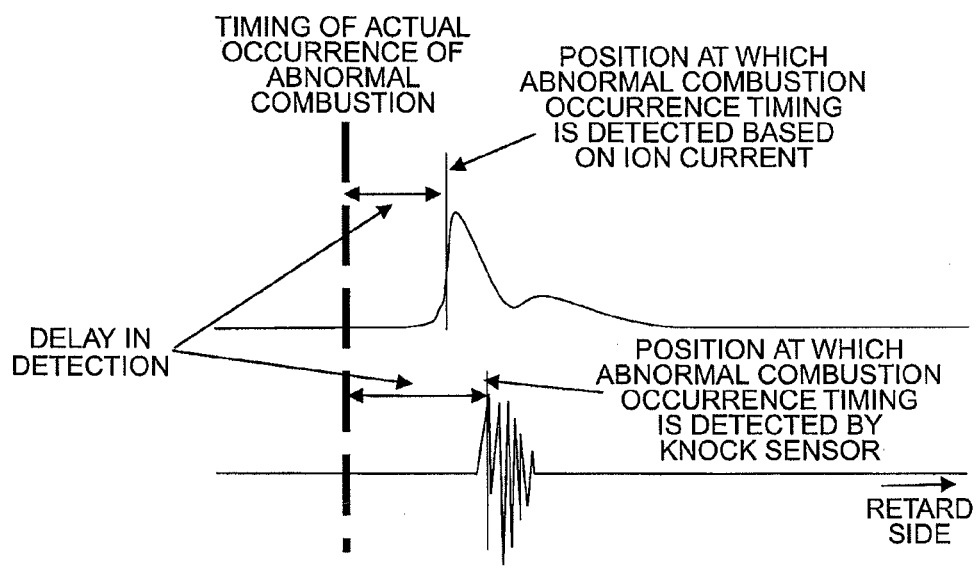
FIG. 11 is an explanatory diagram of a delay in detection by each abnormal combustion detection means.
FIG. 12 is a table illustrating a delay time map according to an operating state.

As the reason why the pre-ignition determination timing and the heat-source pre-ignition determination timing are set for each of the abnormal combustion detection means, a difference in abnormal combustion detection timing between different detection paths as illustrated in FIG. 10 is given. FIG. 11 illustrates an example. A broken line indicates timing at which the abnormal combustion actually occurs. An upper waveform illustrated in FIG. 11 is an ion-current waveform, and a lower waveform is a knock sensor signal waveform. A position, at which the abnormal combustion occurrence timing is detected, is indicated in each of the waveforms illustrated in FIG. 11. An abscissa axis indicates a time, and the right thereof is the retard side. FIG. 11 illustrates that a delay in detection occurs for each of the abnormal combustion detection means. The ion-current sensor 20 detects the occurrence of the abnormal combustion earlier than the knock sensor 19. As described above, each of the abnormal combustion detection means has a delay in detection. The degree of delay in detection differs for each of the abnormal combustion detection means. In consideration of the delay in detection, the pre-ignition determination timing and the heat-source pre-ignition determination timing are set. The delay changes depending on, for example, the engine rpm or the load, and hence it is recommended that a map as illustrated in FIG. 12 be created to perform matching for each of the abnormal combustion detection means.

Figure 13:
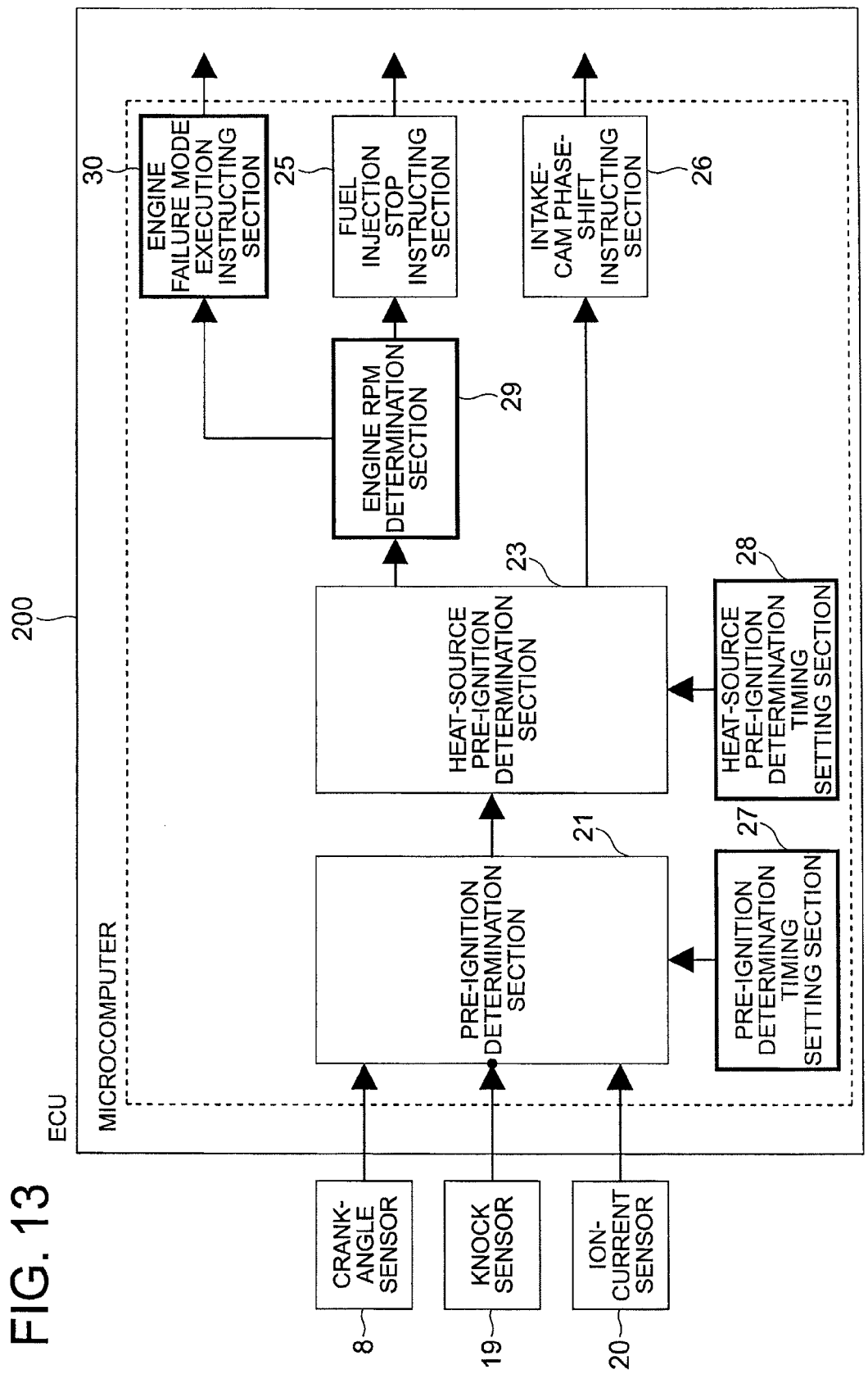
FIG. 13 is a block diagram illustrating the schema of a control apparatus for determining the occurrence of the pre-ignition in a second embodiment.

Next, the schema of pre-ignition control executed in the ECU 200 is described referring to FIG. 13. FIG. 13 is a block diagram illustrating an overall configuration of the pre-ignition which is executed in this second embodiment. FIG. 13 differs from the block diagram of FIG. 4 which is referred to in the first embodiment in the following points. The pre-ignition determination timing calculation section 22 is replaced by a pre-ignition determination timing setting section 27. The heat-source pre-ignition determination timing calculating section 24 is replaced by a heat-source pre-ignition determination timing setting section 28. Moreover, an engine rpm determination section 29 and an engine failure mode execution instructing section 30 are additionally provided.

A configuration of the pre-ignition control section included in the ECU 200 illustrated in FIG. 13 is described. The ECU 200 includes various I/F circuits (not shown) and a microcomputer (not shown). The microcomputer includes an ND converter, a ROM area, a RAM area, and the like. The ND converter converts an analog signal into a digital signal. The ROM area stores a control program and control constants therein. The RAM area stores variables at the time of execution of the program.

The pre-ignition determination section 21 included in the ECU 200 as the pre-ignition control section detects an abnormal combustion based on information from the knock sensor 19 and the ion-current sensor 20. The pre-ignition determination section 21 also detects abnormal combustion occurrence timing based on the abnormal combustion detection information and information from the crank-angle sensor 8. Further, the pre-ignition determination section 21 compares the pre-ignition determination timing which is transmitted from the pre-ignition determination timing setting section 27, and the abnormal combustion occurrence timing with each other to determine the occurrence of pre-ignition. As the pre-ignition determination timing transmitted from the pre-ignition determination timing setting section 27, values set respectively for the abnormal combustion detection means (knock sensor 19 and ion-current sensor 20 in this case) are transmitted.

The heat-source pre-ignition determination section 23 compares the abnormal combustion occurrence timing according to each of the abnormal combustion determination means, which is transmitted from the pre-ignition determination section 21, and the heat-source pre-ignition determination timing transmitted from the heat-source pre-ignition determination timing setting section 28 with each other to determine whether the pre-ignition is the heat-source pre-ignition or the compression pre-ignition. As the heat-source pre-ignition determination timing transmitted from the heat-source pre-ignition determination timing setting section 28, values set respectively for the abnormal combustion detection means (knock sensor 19 and ion-current sensor 20 in this case) are transmitted.

When the pre-ignition is determined as the heat-source pre-ignition by the heat-source pre-ignition determination section 23, the engine rpm determination section 29 determines the engine rpm. When the engine rpm is low, an engine failure mode instruction is issued by the engine failure mode instructing section 30 corresponding to third avoidance means for the heat-source pre-ignition occurring while the engine operates at low rpm. When the engine rpm is high, the fuel injection stop instructing section 25 corresponding to the first avoidance means for the general heat-source pre-ignition instructs the fuel control section (not shown) to stop the fuel supply. When the abnormal combustion is determined as the compression pre-ignition by the heat-source pre-ignition determination section 23, the intake-cam phase-shift instructing section 26 corresponding to the second avoidance means for the compression pre-ignition instructs the phase-shift executing section (not shown) to shift the phase of the intake cam 11. In this manner, the pre-ignition is avoided.

Figure 14:
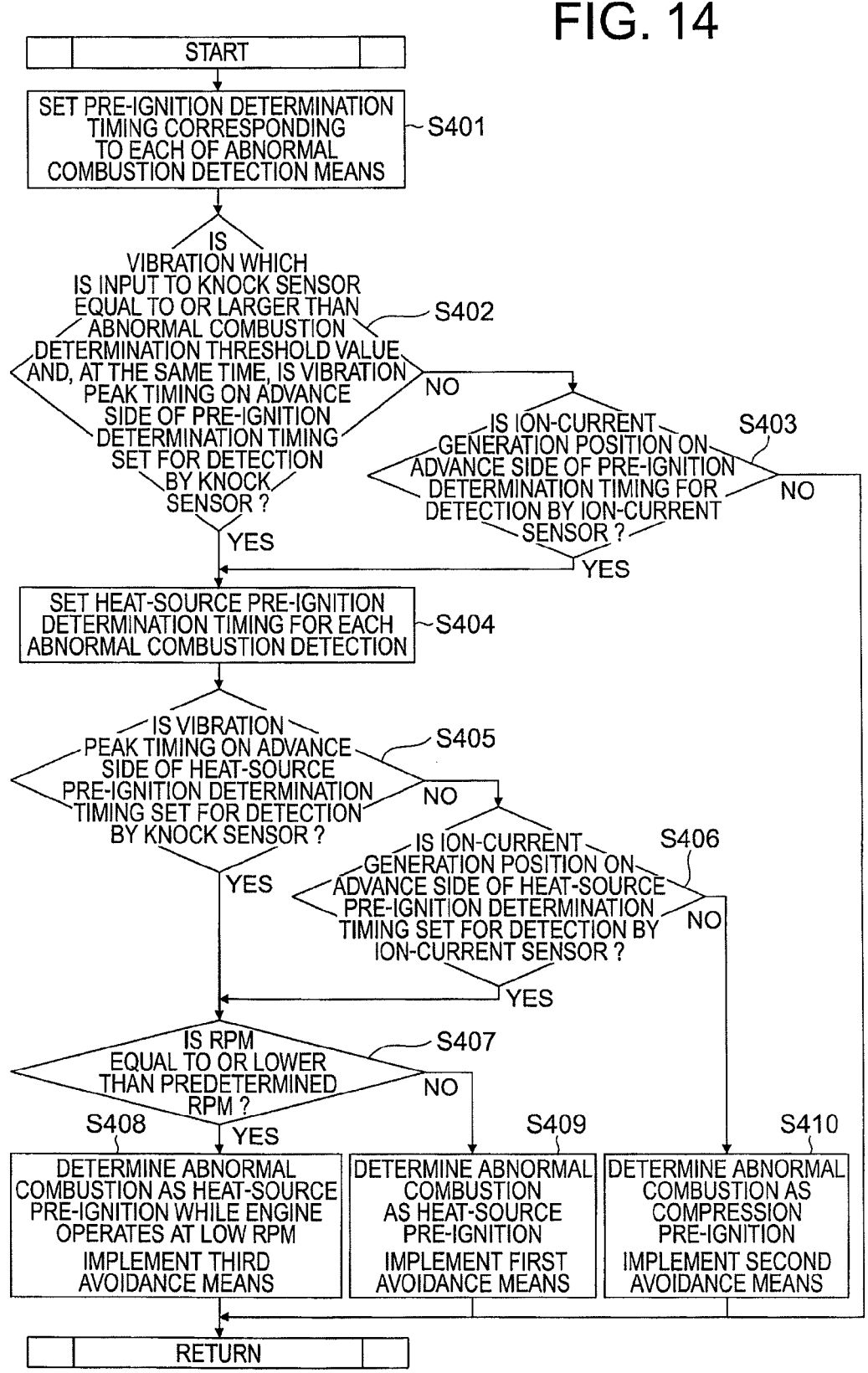
FIG. 14 is a flowchart of the selection of the avoidance means at the time of the determination of the pre-ignition in the second embodiment.

Processing of the second embodiment is described along a flowchart of FIG. 14. The flowchart of FIG. 14 illustrates the processing of determining whether the pre-ignition is the compression pre-ignition or the heat-source pre-ignition. The processing is executed at timing in synchronization with an engine revolution (for example, interruption processing executed at intervals of 180 deg.CA and the like).

First, in a determination section S401, the pre-ignition determination timing is set for each of the abnormal combustion detection means. The pre-ignition determination timing is set in consideration of the delay time until each of the abnormal combustion detection means is informed of the occurrence of the abnormal combustion. The delay time changes depending on the operating state as described above, and hence the matching is performed for the knock sensor 19 according to a map illustrated in FIG. 15 while the matching is performed for the ion-current sensor 20 according to a map illustrated in FIG. 16.

For example, it is assumed that the engine rpm=1,000 r/min and a charging efficiency=50% are the current operating conditions. Then, the delay time in the detection by the knock sensor 19 is set to 5 deg.CA based on the map illustrated in FIG. 15, and the delay time in the detection by the ion-current sensor 20 is set to 3 deg.CA based on the map illustrated in FIG. 16. The pre-ignition determination timing is a value obtained by taking the delay time into consideration in addition to the ignition timing. When the ignition timing is 20 deg.CA. ATDC, the pre-ignition determination timing set for the detection by the knock sensor 19 is set to 25 deg.CA. ATDC and the pre-ignition determination timing set for the detection by the ion-current sensor 20 is set to 23 deg.CA. ATDC.

Next, it is determined in a determination section S402 whether the abnormal combustion is detected by using the knock sensor 19. Specifically, it is determined whether or not the vibration level input to the knock sensor 19 is equal to or larger than the abnormal combustion determination threshold value, and at the same time, the vibration peak position is on the advance side of the pre-ignition determination timing for the detection of the knock sensor 19. If the vibration level is equal to or larger than the abnormal combustion determination threshold value and the vibration peak position is on the advance side, the processing proceeds to Step S404. If not, the processing proceeds to a determination section S403.

For example, it is assumed that the vibration level input to the knock sensor 19 (voltage input to the knock sensor 19) is 2.0 V and the vibration-level peak timing is 4 deg.CA. ATDC. As in the first embodiment, the abnormal combustion determination threshold value is set to the vibration level of 1.0 V. Then, in the case described above, the relation of the vibration level input to the knock sensor>the abnormal combustion determination threshold value is satisfied and the vibration-level peak timing is on the advance side of the pre-ignition determination timing set for the detection by the knock sensor 19. Therefore, the processing proceeds to Step S404.

Next, an operation of the determination section S403 is described. The determination section S403 determines the detection of the abnormal combustion when the ion-current generation position detected by the ion-current sensor 20 is on the advance side of the pre-ignition determination timing set for the detection by the ion-current sensor 20. Therefore, the processing proceeds to Step S404. If not, the processing is terminated.

For example, it is assumed that the ion-current generation position is 2 deg.CA. ATDC. The ion-current generation position is on the advance side of the set pre-ignition determination timing set for the detection by the ion-current sensor 20 in the case described above. Therefore, the processing proceeds to Step S404.

Next, in Step S404, the heat-source pre-ignition determination timing for each of the abnormal combustion determination means is set. For example, as in the case of the delay time which is taken into consideration for setting the pre-ignition determination timing, the heat-source pre-ignition determination timing is set by using the maps of FIGS. 15 and 16. The operating conditions are the same as those used in Step S401, and hence the delay time is 5 deg.CA for the detection by the knock sensor 19 and 3 deg.CA for the detection by the ion-current sensor 20. The abnormal combustion occurring on the advance side of the top dead center is determined as the heat-source pre-ignition, and hence the heat-source pre-ignition determination timing set for the detection by the knock sensor 19 is 5 deg.CA. ATDC and the heat-source pre-ignition determination timing set for the detection by the ion-current sensor 20 is 3 deg.CA. ATDC in consideration of the delay time. The abnormal combustion occurring on the retard side of the heat-source pre-ignition determination timing is determined as the compression pre-ignition, whereas the abnormal combustion occurring on the advance side of the heat-source pre-ignition determination timing is determined as the heat-source pre-ignition.

Next, the processing proceeds to a determination section S405 where it is determined whether the vibration peak timing is on the advance side of the heat-source pre-ignition determination timing set for the detection by the knock sensor 19. If the vibration peak timing is on the advance side of the heat-source pre-ignition determination timing, the processing proceeds to a determination section S407. If not, the processing proceeds to a determination section S406.

For example, when the values used in the determination section S402 are used, the vibration peak timing is 4 deg.CA. ATDC and the heat-source pre-ignition determination timing set for the detection by the knock sensor 19 is 5 deg.CA. ATDC. Therefore, the vibration peak timing is on the advance side of the heat-source pre-ignition determination timing. Therefore, the abnormal combustion is determined as the heat-source pre-ignition, and the processing proceeds to the determination section S407.

Next, the determination section S406 is described. In the determination section S406, it is determined whether or not the ion-current generation timing is on the advance side of the heat-source pre-ignition determination timing set for the detection by the ion-current sensor 20. If the ion-current generation timing is on the advance side of the heat-source pre-ignition determination timing, the processing proceeds to the determination section S407. If not, the processing proceeds to Step S410.

For example, using the values used in the determination section S403, the ion-current generation timing is 2 deg.CA. ATDC and the heat-source pre-ignition determination timing set for the detection by the ion-current sensor 20 is 3 deg.CA. ATDC. Therefore, the ion-current generation timing is on the advance side of the heat-source pre-ignition determination timing. Accordingly, the abnormal combustion is determined as the heat-source pre-ignition, and the processing proceeds to the determination section S407.

Next, in the determination section S407, it is determined whether or not the engine rpm is equal to or lower than predetermined rpm. If the engine rpm is equal to or lower than the predetermined rpm, the processing proceeds to Step S408. If not, the processing proceeds to Step S409. It is known that the heat-source pre-ignition occurring while the engine operates at high rpm generally occurs at about 2,000 r/min or higher. Therefore, when the predetermined rpm is 2,000 r/min and the current engine rpm is 1,000 r/min, the current engine rpm is lower than the predetermined rpm. Therefore, the processing proceeds to Step S408.

Next, in Step S408, it is determined that the currently detected abnormal combustion is the heat-source pre-ignition occurring while the engine operates at low rpm, and the third avoidance control for the heat-source pre-ignition occurring while the engine operates at low rpm is implemented. Then, the processing is terminated. The third avoidance control for the heat-source pre-ignition occurring while the engine operates at low rpm is described below.

In Step S409, it is determined that the currently detected pre-ignition is the heat-source pre-ignition, and the first avoidance control for the heat-source pre-ignition is performed. Then, the processing is terminated. The first avoidance control for the heat-source pre-ignition is the same as that described in the first embodiment, and hence the description thereof is omitted.

Further, in Step S410, it is determined that the currently detected pre-ignition is the compression pre-ignition, and the second avoidance control for the compression pre-ignition is performed. Then, the processing is terminated. The second avoidance control for the compression pre-ignition is the same as that described in the first embodiment, and hence the description thereof is omitted.

Figures 15, 16, 17:
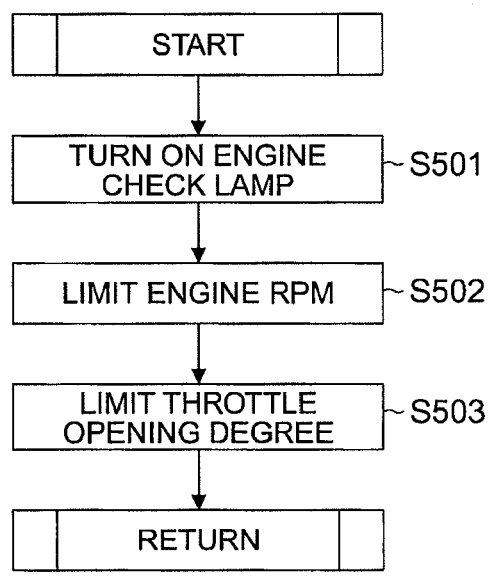
FIG. 15 is a table illustrating a delay time map (in the case of detection by a knock sensor) according to the operating state.
FIG. 16 is a table illustrating a delay time map (in the case of detection by an ion-current sensor) according to the operating state.
FIG. 17 is a flowchart of avoidance control set for the heat-source pre-ignition occurring while the internal combustion engine operates at low rpm.
Figure 18:
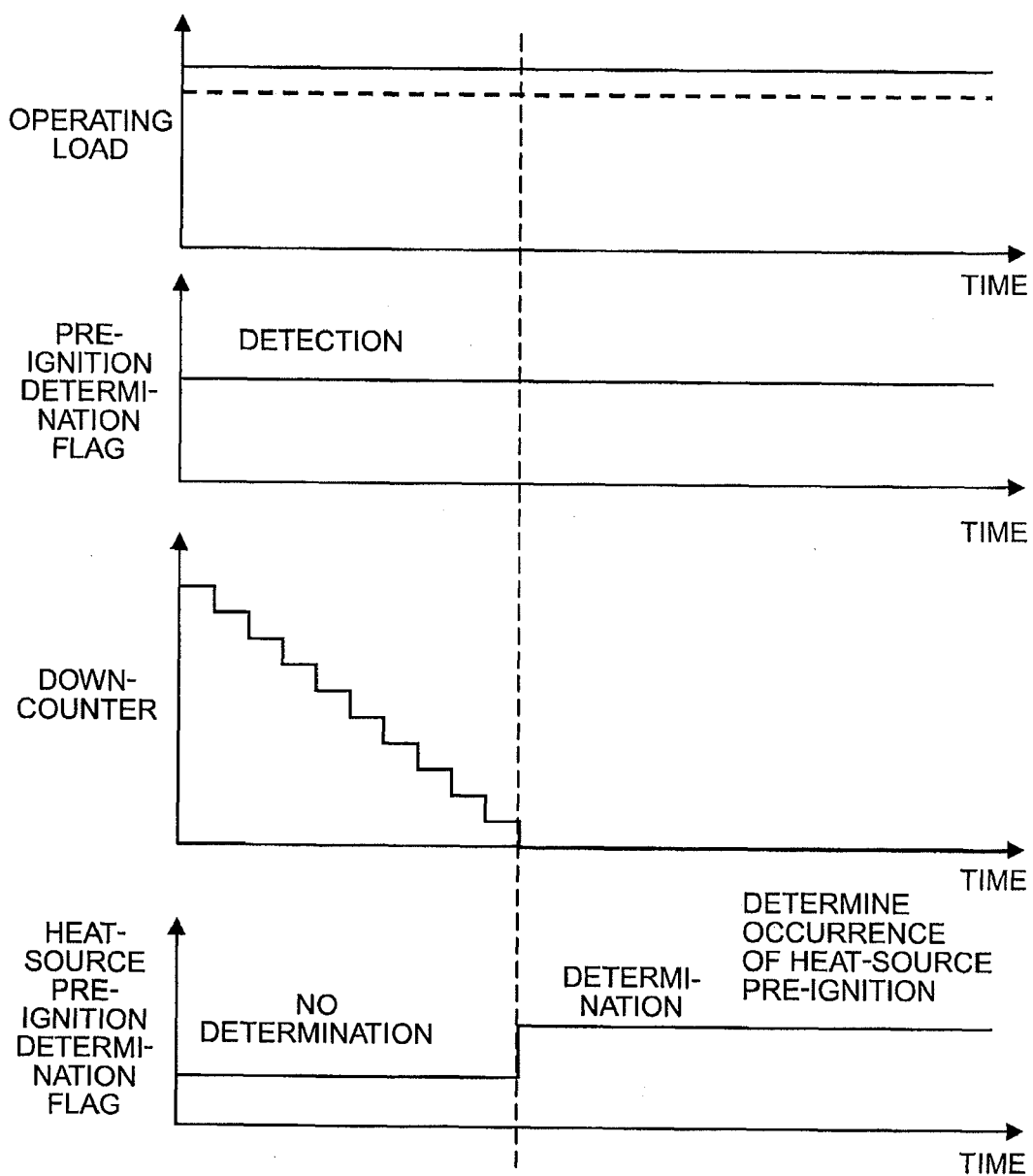
FIG. 18 is a time chart of the determination of the pre-ignition (during constant operation) described in JP 11-50892 A.
Figure 19:
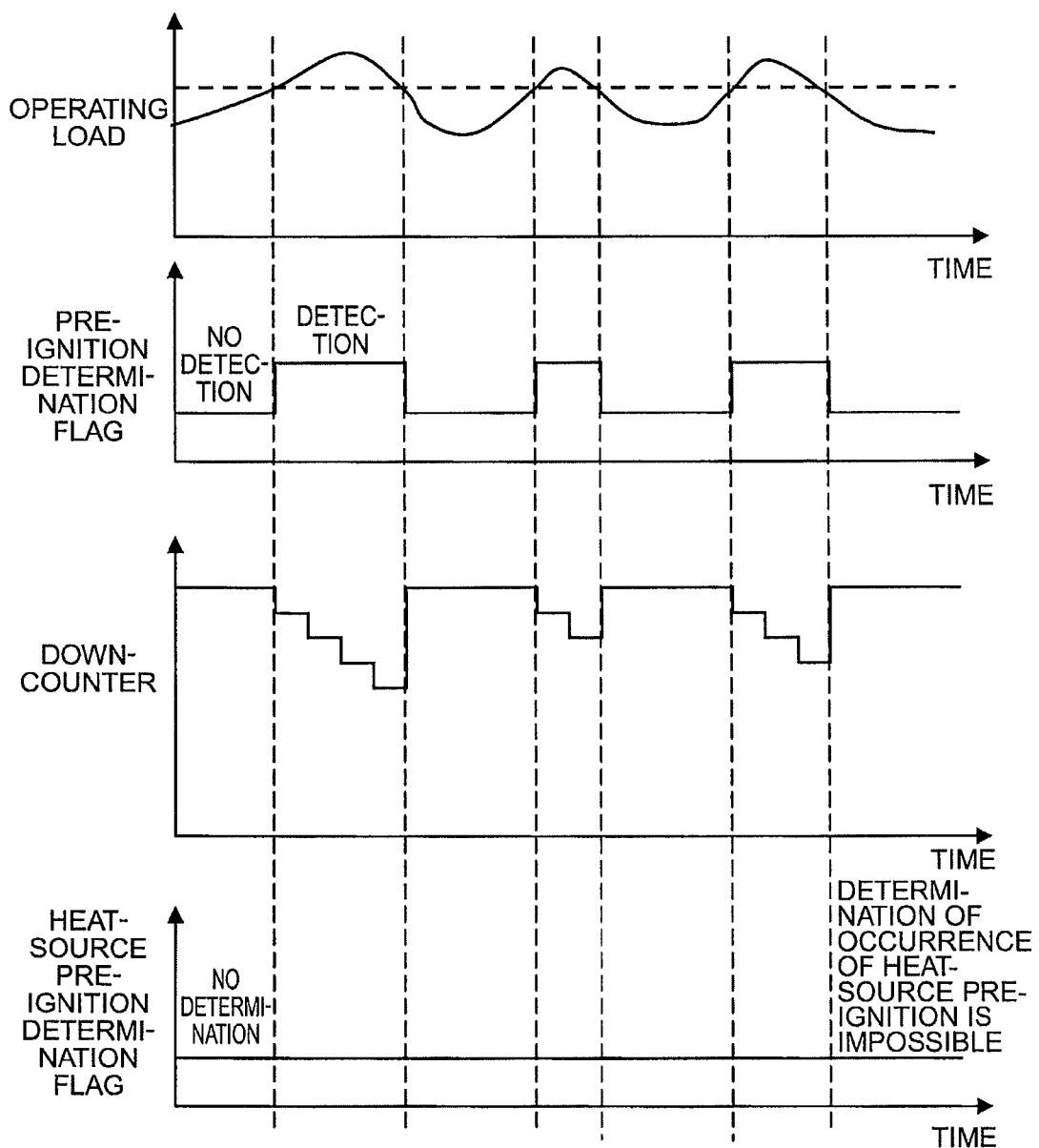
FIG. 19 is a time chart of the determination of the pre-ignition (during intermittent operation) described in JP 11-50892 A.

Next, the third avoidance control in the case where the abnormal combustion is determined as the heat-source pre-ignition occurring while the engine operates at low rpm is described referring to a flowchart of FIG. 17. The flowchart of FIG. 17 illustrates processing of performing control for avoiding the heat-source pre-ignition occurring while the engine operates at low rpm after the determination of the occurrence of the heat-source pre-ignition occurring while the engine operates at low rpm.

In Step S501, an engine check lamp (not shown) is turned ON as a result of an engine failure. The processing proceeds to Step S502 where the engine rpm is limited. If the engine rpm detected by engine rpm detection means (not shown) is equal to or larger than the predetermined rpm, the fuel supply is stopped. Next, the processing proceeds to Step S503 where the degree of opening of the throttle is limited by throttle control means (not shown) for controlling the amount of intake air introduced into the engine. Then, the control for avoiding the heat-source pre-ignition is terminated. It is desirable that the above-mentioned avoidance operation be continued until the engine is inspected by a dealer or the like.

As the avoidance operation, for example, it is considered to limit the engine rpm to 2,000 r/min or less and the degree of opening of the throttle to 30% or less. Any limit values of the engine rpm and the load may be used as long as the heat-source pre-ignition occurring while the engine operates at low rpm does not occur. In any case, the limit values of the engine rpm and the load are set so that the vehicle may run at about 40 km/h.

As described above, by setting the pre-ignition determination timing and the heat-source pre-ignition determination timing, the pre-ignition may be detected accurately even if the abnormal combustion detection means is changed. Moreover, even for the heat-source pre-ignition occurring while the engine operates at low rpm, which has a high possibility of causing an engine failure, appropriate avoidance means may be implemented.

Hereinafter, the characteristics and effects of the present invention are described.

A control apparatus for an internal combustion engine according to the present invention includes: abnormal combustion detection means for detecting an abnormal combustion due to self-ignition occurring regardless of ignition performed by ignition means for implementing ignition at timing set by ignition timing setting means for setting ignition timing of an air-fuel mixture present in a combustion chamber of the internal combustion engine; pre-ignition determination timing setting means for setting pre-ignition determination timing; pre-ignition determination means for detecting abnormal combustion occurrence timing based on abnormal combustion detection information from the abnormal combustion detection means so as to determine whether or not the abnormal combustion is pre-ignition based on comparison between the pre-ignition determination timing set by the pre-ignition determination timing setting means and the abnormal combustion occurrence timing; heat-source pre-ignition determination timing setting means for setting heat-source pre-ignition determination timing; heat-source pre-ignition determination means for determining whether the pre-ignition is heat-source pre-ignition or compression pre-ignition based on comparison between the abnormal combustion occurrence timing set by the pre-ignition determination means and the heat-source pre-ignition determination timing set by the heat-source pre-ignition determination timing setting means; first avoidance means for avoiding the heat-source pre-ignition in a case where the pre-ignition is determined as the heat-source pre-ignition; and second avoidance means for avoiding the compression pre-ignition in a case where the pre-ignition is determined as the compression pre-ignition, in which: upon detection of the abnormal combustion, the first avoidance means determines that the pre-ignition is the heat-source pre-ignition and implements avoidance of the heat-source pre-ignition when the abnormal combustion occurrence timing is on an advance side of the pre-ignition determination timing set by the pre-ignition determination timing setting means and is on an advance side of the heat-source pre-ignition determination timing set by the heat-source pre-ignition determination timing setting means; and upon detection of the abnormal combustion, the second avoidance means determines that the pre-ignition is the compression pre-ignition and implements avoidance of the compression pre-ignition when the abnormal combustion occurrence timing is on the advance side of the pre-ignition determination timing set by the pre-ignition determination timing setting means and is on a retard side of the heat-source pre-ignition determination timing set by the heat-source pre-ignition determination timing setting means.

According to the structure described above, it is possible to determine whether the abnormal combustion is the heat-source pre-ignition or the compression pre-ignition based on the abnormal combustion occurrence timing of a single abnormal combustion. Moreover, the pre-ignition may be effectively avoided to prevent the internal combustion engine from being damaged.

Further, the heat-source pre-ignition determination timing setting means sets the heat-source pre-ignition determination timing to a top dead center.

According to the structure described above, the heat-source pre-ignition determination timing is not required to be changed according to the type of internal combustion engine. Therefore, the number of steps for matching may be reduced.

Further, the pre-ignition determination timing setting means sets the pre-ignition determination timing to the ignition timing.

According to the structure describe above, the abnormal combustion, which occurs regardless of the ignition timing, may be determined as the pre-ignition when the timing of determination of the abnormal combustion is before the ignition timing. Therefore, by setting the pre-ignition determination timing as the ignition timing, the pre-ignition timing is not required to be changed according to the type of internal combustion engine. Accordingly, the number of steps for matching may be reduced.

Further, the abnormal combustion detection means includes a plurality of abnormal combustion detection means, the pre-ignition determination timing setting means determines the pre-ignition determination timing for each of the abnormal combustion determination means, and the pre-ignition determination means determines whether the abnormal combustion is the pre-ignition based on comparison between the abnormal combustion occurrence timing set according to each of the abnormal combustion detection means and the pre-ignition determination timing set according to each of the abnormal combustion determination means by the pre-ignition determination timing setting means.

According to the structure described above, the number of times of erroneous determination or incomplete detection may also be reduced by preparing the plurality of abnormal combustion detection means. By setting the pre-ignition determination timing for each of the abnormal combustion detection means, the number of times of erroneous determination or incomplete detection of the pre-ignition may be reduced when the abnormal combustion occurrence timing detected by one of the abnormal combustion detection means differs from the abnormal combustion occurrence timing detected by another abnormal combustion detection means.

This is because it is known that the timing of detection of the abnormal combustion detected by the abnormal combustion detection means differs from the timing of actual occurrence of the abnormal combustion. For example, a difference in detection timing between the detection of the pre-ignition by the ion-current sensor and the detection of the pre-ignition by the knock sensor is described. Different detection paths used respectively by the ion-current sensor and the knock sensor are illustrated in FIG. 10.

The ion-current sensor applies the voltage to the spark plug so as to detect the current using the combustion ions generated in the cylinder as a path. As illustrated in FIG. 10, a delay is generated between the occurrence of the pre-ignition in the cylinder and the arrival of the combustion ions at the spark plug. Therefore, a delay is generated between the timing of actual occurrence of the pre-ignition and the detected timing.

On the other hand, the knock sensor is a sensor which converts the vibration of the engine block into an electric signal. As illustrated in FIG. 10, the pre-ignition occurs in the cylinder. The vibration occurring due to the pre-ignition is transmitted by the engine block. Then, the vibration of the engine block is detected by the knock sensor.

Thus, the knock sensor detects the vibration of the engine block, which is a secondary element occurring due to the pre-ignition, and hence a delay is generated between the timing of actual occurrence of the pre-ignition and the detected timing. The secondary element is detected by the knock sensor, and hence a delay is also generated in the detection by the ion-current sensor described above.

For example, in one conceivable case, the abnormal combustion detection by the ion-current sensor is delayed by 5 deg.CA from the timing of actual occurrence of the abnormal combustion and the abnormal combustion detection by the knock sensor is delayed by 10 deg.CA from the timing of actual occurrence of the abnormal combustion. The delay in detection by each of the detection means changes depending on the operating state, and hence specific matching is required. Due to the phenomenon described above, it is considered that the erroneous determination or incomplete detection may be performed with only one heat-source pre-ignition determination timing when the plurality of abnormal combustion detection means are prepared.

According to the structure described above, the number of times of erroneous determination or incomplete detection may also be reduced by preparing the plurality of abnormal combustion detection means. By setting the heat-source pre-ignition determination timing for each of the abnormal combustion detection means, the number of times of erroneous determination or incomplete detection of the heat-source pre-ignition may be reduced when the abnormal combustion occurrence timing detected by one of the abnormal combustion detection means differs from the abnormal combustion occurrence timing detected by another abnormal combustion detection means.

Further, the heat-source pre-ignition determination timing setting means sets the heat-source pre-ignition determination timing for each of the abnormal combustion detection means, and the heat-source pre-ignition determination means determines whether the pre-ignition is the heat-source pre-ignition or the compression pre-ignition based on comparison between the abnormal combustion detection timing set according to each of the abnormal combustion detection means by the pre-ignition determination means and the heat-source pre-ignition determination timing set according to each of the abnormal combustion detection means by the heat-source pre-ignition determination timing setting means.

According to the structure described above, as described above, the number of times of erroneous determination or incomplete detection may also be reduced by preparing the plurality of abnormal combustion detection means. By setting the heat-source pre-ignition determination timing for each of the abnormal combustion detection means, the number of times of erroneous determination or incomplete detection may be reduced when the abnormal combustion occurrence timing detected by one of the abnormal combustion detection means differs from the abnormal combustion occurrence timing detected by another abnormal combustion detection means.

Further, the control apparatus for the internal combustion engine further includes: an engine check lamp turned ON when the internal combustion engine is operated in an engine failure mode; throttle control means for controlling an intake air amount introduced into the internal combustion engine; engine rpm detection means capable of detecting engine rpm; and third avoidance means for implementing avoidance when the pre-ignition is determined as the heat-source pre-ignition occurring while the internal combustion engine operates at low rpm, in which: when the pre-ignition is determined as the heat-source pre-ignition occurring while the internal combustion engine operates at low rpm, the third avoidance means causes the internal combustion engine to operate in the engine failure mode, turns ON the engine check lamp, and limits a degree of opening of a throttle and the engine rpm.

As described above, it is considered that the heat-source pre-ignition occurs even while the engine operates at low rpm. When the heat-source pre-ignition occurs while the engine operates at low rpm, it is supposed that a cooling device for the engine has failed or one of the plugs is damaged in the case of the dual ignition system. Therefore, the internal combustion engine is required to be operated in the engine failure mode. According to the structure described above, by performing the engine operation at low rpm under a low load as the operation in the engine failure mode upon detection of the heat-source pre-ignition occurring while the engine operates at low rpm, a safe operation is enabled without further causing the heat-source pre-ignition. Moreover, by the operation in the engine failure mode, it is possible to urge the driver to repair the engine.

What is claimed is:

1. A control apparatus for an internal combustion engine, comprising:
   abnormal combustion detection means for detecting an abnormal combustion due to self-ignition occurring regardless of ignition performed by ignition means for implementing ignition at timing set by ignition timing setting means for setting ignition timing of an air-fuel mixture present in a combustion chamber of the internal combustion engine;
   pre-ignition determination timing setting means for setting pre-ignition determination timing;
   pre-ignition determination means for detecting abnormal combustion occurrence timing based on abnormal combustion detection information from the abnormal combustion detection means so as to determine whether or not the abnormal combustion is pre-ignition based on comparison between the pre-ignition determination timing set by the pre-ignition determination timing setting means and the abnormal combustion occurrence timing;
   heat-source pre-ignition determination timing setting means for setting heat-source pre-ignition determination timing;
   heat-source pre-ignition determination means for determining whether the pre-ignition is heat-source pre-ignition or compression pre-ignition based on comparison between the abnormal combustion occurrence timing set by the pre-ignition determination means and the heat-source pre-ignition determination timing set by the heat-source pre-ignition determination timing setting means;
   first avoidance means for avoiding the heat-source pre-ignition in a case where the pre-ignition is determined as the heat-source pre-ignition; and
   second avoidance means for avoiding the compression pre-ignition in a case where the pre-ignition is determined as the compression pre-ignition, wherein:
   upon detection of the abnormal combustion, the first avoidance means determines that the pre-ignition is the heat-source pre-ignition and implements avoidance of the heat-source pre-ignition when the abnormal combustion occurrence timing is on an advance side of the pre-ignition determination timing set by the pre-ignition determination timing setting means and is on an advance side of the heat-source pre-ignition determination timing set by the heat-source pre-ignition determination timing setting means; and
   upon detection of the abnormal combustion, the second avoidance means determines that the pre-ignition is the compression pre-ignition and implements avoidance of the compression pre-ignition when the abnormal combustion occurrence timing is on the advance side of the pre-ignition determination timing set by the pre-ignition determination timing setting means and is on a retard side of the heat-source pre-ignition determination timing set by the heat-source pre-ignition determination timing setting means.

2. A control apparatus for an internal combustion engine according to claim 1, wherein the heat-source pre-ignition determination timing setting means sets the heat-source pre-ignition determination timing to a top dead center.

3. A control apparatus for an internal combustion engine according to claim 1, wherein the pre-ignition determination timing setting means sets the pre-ignition determination timing to the ignition timing.

4. A control apparatus for an internal combustion engine according to claim 1, wherein:
   the abnormal combustion detection means comprise a plurality of abnormal combustion detection means;
   the pre-ignition determination timing setting means sets the pre-ignition determination timing for each of the plurality of abnormal combustion determination means; and
   the pre-ignition determination means determines whether the abnormal combustion is the pre-ignition based on comparison between the abnormal combustion occurrence timing set according to each of the plurality of abnormal combustion detection means and the pre-ignition determination timing set according to each of the plurality of abnormal combustion determination means by the pre-ignition determination timing setting means.

5. A control apparatus for an internal combustion engine according to claim 4, wherein:

the heat-source pre-ignition determination timing setting means sets the heat-source pre-ignition determination timing for each of the plurality of abnormal combustion detection means; and the heat-source pre-ignition determination means determines whether the pre-ignition is the heat-source pre-ignition or the compression pre-ignition based on comparison between the abnormal combustion detection timing set according to each of the plurality of abnormal combustion detection means by the pre-ignition determination means and the heat-source pre-ignition determination timing set according to each of the plurality of abnormal combustion detection means by the heat-source pre-ignition determination timing setting means.

6. A control apparatus for an internal combustion engine according to claim 1, further comprising:

an engine check lamp turned ON when the internal combustion engine is operated in an engine failure mode;

throttle control means for controlling an intake air amount introduced into the internal combustion engine;

engine rpm detection means capable of detecting engine rpm; and third avoidance means for implementing avoidance when the pre-ignition is determined as the heat-source pre-ignition occurring while the internal combustion engine operates at low rpm, wherein when the pre-ignition is determined as the heat-source pre-ignition occurring while the internal combustion engine operates at low rpm, the third avoidance means causes the internal combustion engine to operate in the engine failure mode, turns ON the engine check lamp, and limits a degree of opening of a throttle and the engine rpm.

* * * * *